US012616215B2

(12) United States Patent
Nagel

(10) Patent No.: US 12,616,215 B2
(45) Date of Patent: May 5, 2026

(54) DISMOUNTABLE POULTRY PROCESSING KNIFE AND A MOUNTING FRAME

(71) Applicant: Meyn Food Processing Technology B.V., Oostzaan (NL)

(72) Inventor: Bas Nagel, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 159 days.

(21) Appl. No.: 17/963,655

(22) Filed: Oct. 11, 2022

(65) Prior Publication Data

US 2023/0120511 A1    Apr. 20, 2023

(30) Foreign Application Priority Data

Oct. 18, 2021    (NL) ..................................... 2029457

(51) Int. Cl.
*A22C 17/00*          (2006.01)
*A22C 21/00*          (2006.01)

(52) U.S. Cl.
CPC ...... *A22C 21/0046* (2013.01); *A22C 17/0006* (2013.01); *A22C 21/003* (2013.01); *A22C 21/0069* (2013.01)

(58) Field of Classification Search
CPC . A22B 5/203; A22C 17/0006; A22C 21/0023; A22C 21/003; A22C 21/0069
USPC ........................................ 452/135, 149, 160
See application file for complete search history.

(56) References Cited

U.S. PATENT DOCUMENTS

| | | | | | |
|---|---|---|---|---|---|
| 3,340,916 | A | * | 9/1967 | Burch | A22B 5/166 |
| | | | | | 99/589 |
| 4,233,737 | A | * | 11/1980 | Poehlmann | B26B 1/046 |
| | | | | | 30/344 |
| 5,211,097 | A | * | 5/1993 | Grasselli | B26D 7/2614 |
| | | | | | 83/856 |
| 6,086,470 | A | * | 7/2000 | Ranniger | A22C 17/12 |
| | | | | | 452/136 |
| 6,299,523 | B1 | * | 10/2001 | Wonderlich | A22B 5/166 |
| | | | | | 452/127 |
| 7,172,502 | B1 | * | 2/2007 | Bergman | A22B 5/166 |
| | | | | | 452/129 |
| 8,414,364 | B2 | * | 4/2013 | Weber | A22B 5/166 |
| | | | | | 452/127 |
| 10,786,922 | B2 | * | 9/2020 | Gereg | B26D 1/0006 |
| 11,193,858 | B2 | * | 12/2021 | Hunter | A61B 17/322 |
| 11,772,293 | B2 | * | 10/2023 | Bucks | B26D 3/28 |
| | | | | | 83/403 |

(Continued)

FOREIGN PATENT DOCUMENTS

| | | | |
|---|---|---|---|
| AU | 2007205723 | A1 | 2/2009 |
| DE | 2610169 | A1 | 9/1977 |
| EP | 2129501 | B1 | 6/2015 |

OTHER PUBLICATIONS

Search Report for NL Patent Application No. 2029457 dated Jun. 2, 2022 (3 pages).

*Primary Examiner* — David J Parsley

(74) *Attorney, Agent, or Firm* — Dority & Manning, P.A.

(57)          ABSTRACT

A dismountable poultry processing knife and mounting frame. The mounting frame provided with a quick release mechanism for quickly mounting or dismounting of a poultry processing knife while avoiding screw connections. The poultry processing knife provided with quick release features which are arranged to cooperate with the quick release mechanism of the mounting frame.

11 Claims, 7 Drawing Sheets

(56)  References Cited

U.S. PATENT DOCUMENTS

| 2010/0175267 | A1 | 7/2010 | Seber |
| 2014/0090536 | A1 | 4/2014 | Ornelaz, Jr. |

* cited by examiner

12

12'

14

DISMOUNTABLE POULTRY PROCESSING KNIFE AND A MOUNTING FRAME

PRIORITY STATEMENT

The present application claims priority under 35 U.S.C. § 119 to Dutch patent application No. 2029457, filed on Oct. 18, 2021.

FIELD OF THE INVENTION

In general, the present disclosure relates to a mounting frame for a dismountable poultry processing knife and also to a dismountable poultry processing knife.

BACKGROUND OF THE INVENTION

In poultry processing, frequent use is made of poultry processing knives. The known poultry processing knives are used for simply cutting poultry parts longitudinally or transversely and also for boning of particular parts of the poultry.

As an example, EP 0 201 980 discloses a boning apparatus that is provided with boning blades having facing cutting edges that are adjusted to the bones to be processed. The boning blades are releasably connected to blade carriers and are able to move rectilinearly towards and away from each other.

A problem with known poultry processing equipment in which poultry processing knives are applied is that it is laborious to change the poultry processing knives for maintenance or other purposes such as cleaning. It is therefore an object of the invention to make removal or placement of the poultry processing knives less laborious and less cumbersome.

BRIEF DESCRIPTION OF THE INVENTION

Exemplary embodiments of the invention include a mounting frame and a dismountable poultry processing knife, as well as a processing line for processing poultry, according to the description that follows and as set forth in one or more of the appended claims. Aspects and advantages of the invention will be set forth in part in the following description, may be apparent from the description, or may be learned through practice of the invention.

In an exemplary embodiment of the invention, a mounting frame is provided with a quick release mechanism for quickly mounting or dismounting of a poultry processing knife. The quick release mechanism is designed for cooperation with quick release features of the poultry processing knife. The quick release mechanism may include a clamping portion for releasably clamping a rim of the processing knife. The clamping portion may include at least one arresting pin with a clamping head. The at least one arresting pin may be longitudinally moveable with respect to a body of the mounting frame so as to move the clamping head between a position in which it clampingly engages the rim of the poultry processing knife and another position in which it is disengaged or loose from the rim of the poultry processing knife while remaining mounted or attached to the mounting frame.

In another exemplary embodiment the invention, a dismountable poultry processing knife is provided for mounting on a mounting frame. The poultry processing knife may be provided with quick release features that are arranged to cooperate with a quick release mechanism of the mounting frame. The quick release features of the poultry processing knife may include at least one receptacle for the at least one arresting pin of the mounting frame. The at least one receptacle may be provided on a rim of the poultry processing knife where the rim is arranged to be clamped by the releasable clamping portion of the mounting frame.

In an exemplary aspect, the at least one receptacle of the dismountable poultry processing knife may be equipped to snugly receive the at least one arresting pin therein that forms part of the quick release mechanism of the mounting frame.

With reference to the mounting frame, multiple exemplary embodiments are provided. For example, in one embodiment the pin may be provided with an external screw thread and arranged to cooperate with a nut so as to clampingly engage the rim of the poultry processing knife with the clamping head of the pin.

In another exemplary embodiment, the pin is provided with a longitudinal through hole with internal screw thread and arranged to cooperate with a bolt so as to clampingly engage the rim of the poultry processing knife with the clamping head of the pin.

The above mentioned exemplary embodiments are well suited to make quick mounting and dismounting of the poultry processing knife possible, in particular since the pin may simply remain attached or connected to the mounting frame during placement or replacement of the poultry processing knife.

In another exemplary aspect, the pin may be provided with external flat portions arranged to cooperate with mating surfaces forming part of the mounting frame so as to prevent rotation of the pin.

In another exemplary aspect, the body of the mounting frame may be equipped with at least one protrusion arranged to guide the processing knife during its mounting on or dismounting from the body of the mounting frame and/or to secure the position of the knife with respect to the mounting frame.

In yet another exemplary embodiment, the clamping portion of the mounting frame may include at least two arresting pins at a preselected distance from each other, wherein each of the arresting pins has a clamping head for engaging the rim of the poultry processing knife.

When applying at least two arresting pins, in one exemplary aspect, the at least two arresting pins may be jointly movable towards and away from the body of the mounting frame so as to facilitate mounting or dismounting and to ensure a correct positioning of the poultry processing knife during clamping. This may be done with springs or clips being arranged to cooperate with the two arresting pins. Correspondingly, the dismountable poultry processing knife of the invention is may be provided with as many receptacles as there are arresting pins on the mounting frame, wherein each arresting pin may be equipped to snugly receive its corresponding arresting pin that forms part of the quick release mechanism of the mounting frame.

In some exemplary embodiments of the mounting frame, the at least two arresting pins are connected with a rod which extends generally parallel to the body of the mounting frame so as to enable that movement of the rod in a direction perpendicular to the mounting frame causes movement of the at least two arresting pins.

The quick release mechanism of the mounting frame may include a lever that engages the rod connecting the at least two arresting pins with the lever being movable for moving the rod vis-à-vis the body of the frame. The use of such a lever further promotes the ease of mounting and dismounting a poultry processing knife on or from the mounting frame. The lever may be movable between a first position wherein the quick release mechanism is unlocked and a second position wherein the quick release mechanism is locked.

The lever may include an indented portion arranged to stably receive the rod connecting the at least two arresting pins when the lever is in the second position wherein the quick release mechanism is locked. These exemplary features may avoid the lever unintentionally moving to the first position wherein the quick release mechanism is unlocked, and that consequently the poultry processing knife may get released from the mounting frame.

In another exemplary aspect, at least one of the two arresting pins may be provided with a slit in a vicinity of the respective clamping heads of the arresting pins. The slit of the arresting pin is dimensioned to receive and/or enable passage of the rim of the processing knife.

The body of the mounting frame may be equipped with at least one protrusion arranged to guide the poultry processing knife during its mounting on or dismounting from the body of the mounting frame and/or to secure the proper position of the poultry processing knife with respect to the mounting frame. Correspondingly, the rim of the poultry processing knife may be provided with at least one guiding slit that is tailored to the at least one protrusion provided on the body of the mounting frame.

The skilled person will understand that the mounting frame and the dismountable poultry processing knife of embodiments of the invention are usable in a diversity of poultry processing applications. Embodiments may be usable, for example, in a boning operation, wherein it may be desirable that the knife has a curved cutting edge pointing away from the rim of the poultry processing knife that is designed to cooperate with the mounting frame.

Embodiments of the invention may be desirably applied in a continuous operation on a series of poultry carcasses executed in a poultry processing line, which is then accordingly equipped with a mounting frame for a dismountable poultry processing knife according to embodiments of the invention. Accordingly, the dismountable poultry processing knife may then be mounted on the mounting frame.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The accompanying figures, which are incorporated into and form a part of the specification, illustrates one or more embodiments of the present invention and, together with the description, serves to explain the principles of the invention. The figures only for the purpose of illustrating one or more embodiments of the invention and is not to be construed as limiting the invention.

In the figures:

FIGS. 9 and 10 illustrate another exemplary embodiment of a mounting frame of the present invention in which FIG. 9 is an exploded view and FIG. 10 is an assembled view.

FIGS. 11 and 12 illustrate still another exemplary embodiment of a mounting frame of the present invention in which FIG. 11 is an exploded view and FIG. 12 is an assembled view.

Whenever in the figures the same reference numerals are applied, these numerals refer to the same parts.

DETAILED DESCRIPTION OF THE INVENTION

Figure 1:
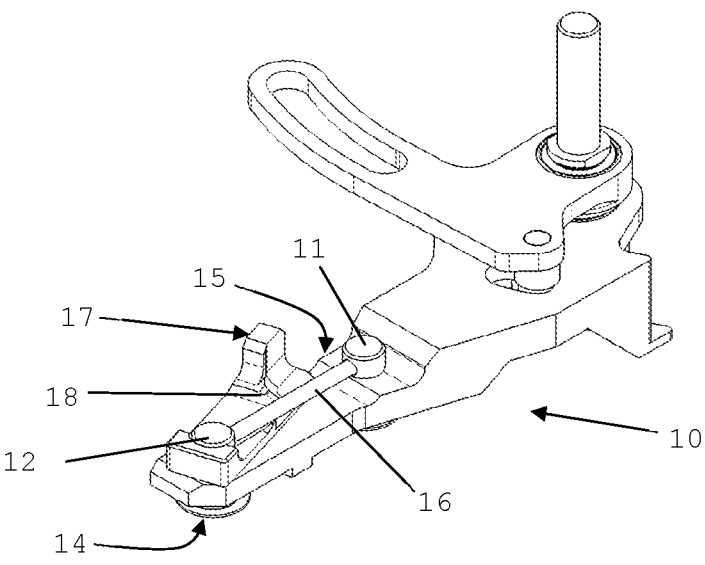
FIG. 1 is an isometric view of a first exemplary embodiment of a mounting frame of the invention in an unlocked position.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
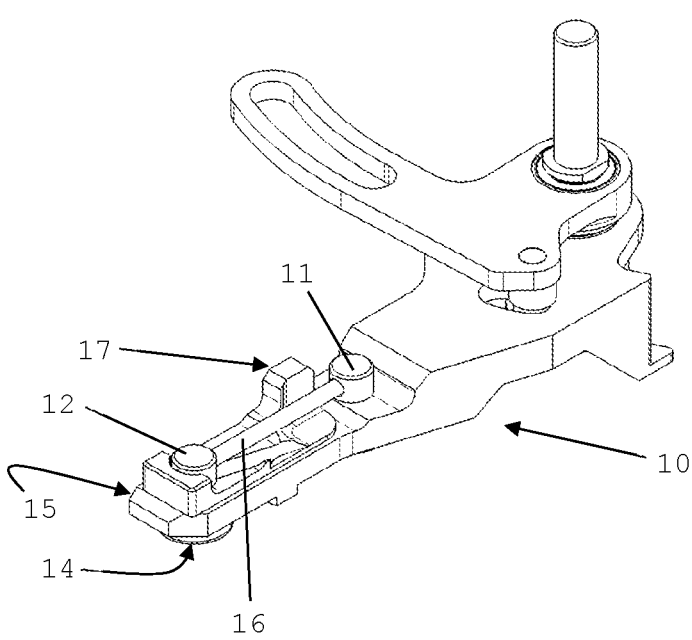
FIG. 2 is an isometric view the first embodiment the mounting frame according to FIG. 1 in a locked position.
Figure 4:
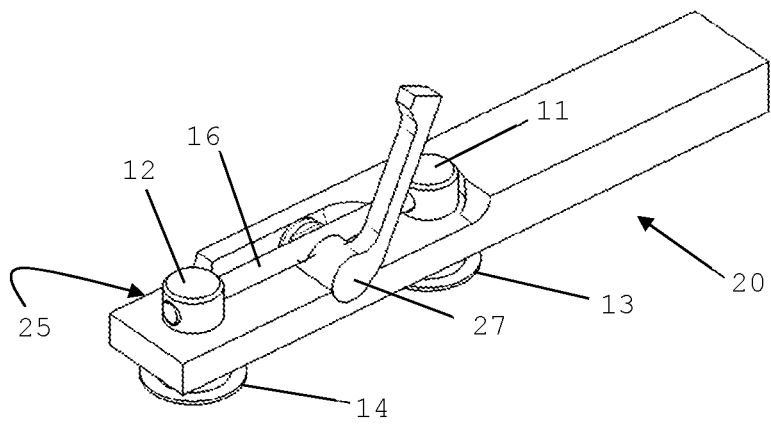
FIG. 4 is an isometric view of a second exemplary embodiment of a mounting frame according to the invention in an unlocked position.
Figure 5:
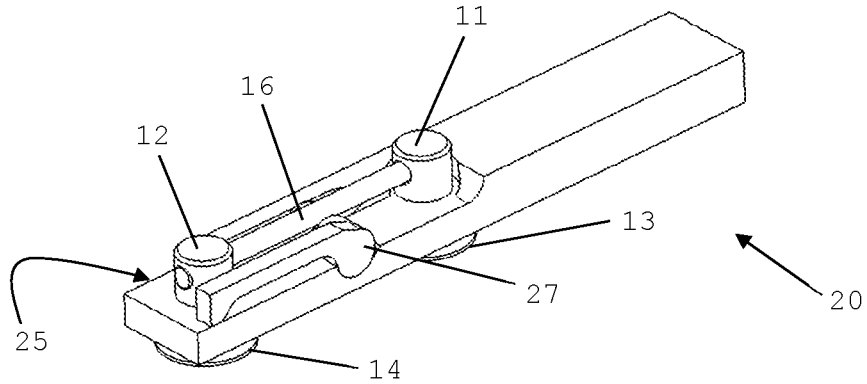
FIG. 5 is an isometric view of the second exemplary embodiment the mounting frame according to FIG. 4 in a locked position.
Figure 6:
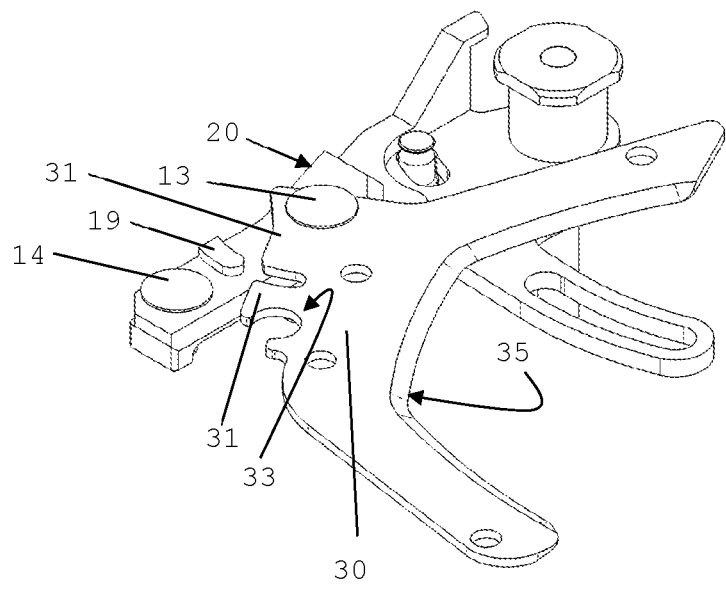
FIG. 6 provides an isometric view of a mounting frame according to an exemplary embodiment of the invention together with an exemplary poultry processing knife of the invention in an intermediate stage of mounting.
Figure 7:
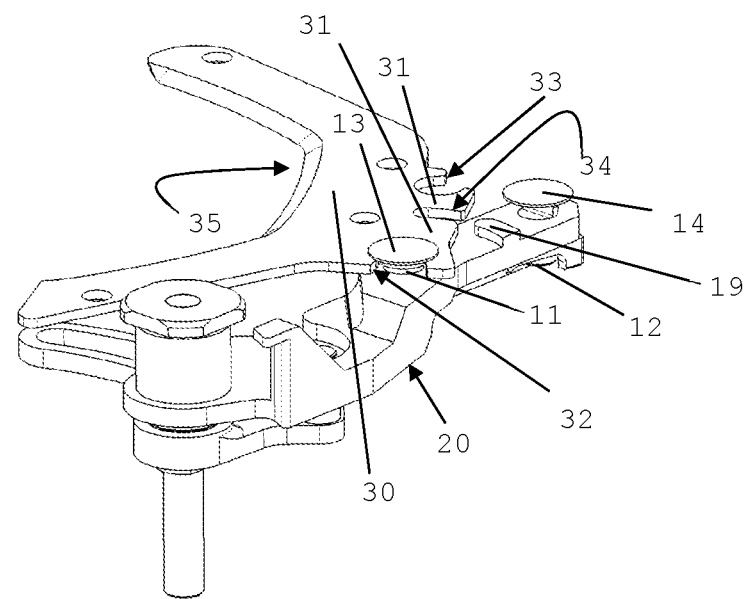
FIG. 7 shows the exemplary mounting frame and poultry processing knife of FIG. 6 from a different angle.

For clarity, FIG. 1 and FIG. 2 show only an exemplary embodiment of a mounting frame 10 of the invention and without an exemplary poultry processing knife 30 of the invention (see FIGS. 6 and 7). Likewise, for clarity, FIGS. 4 and 5 show another embodiment of a mounting frame 20 of the invention without the exemplary poultry processing knife 30.

Figure 3A:
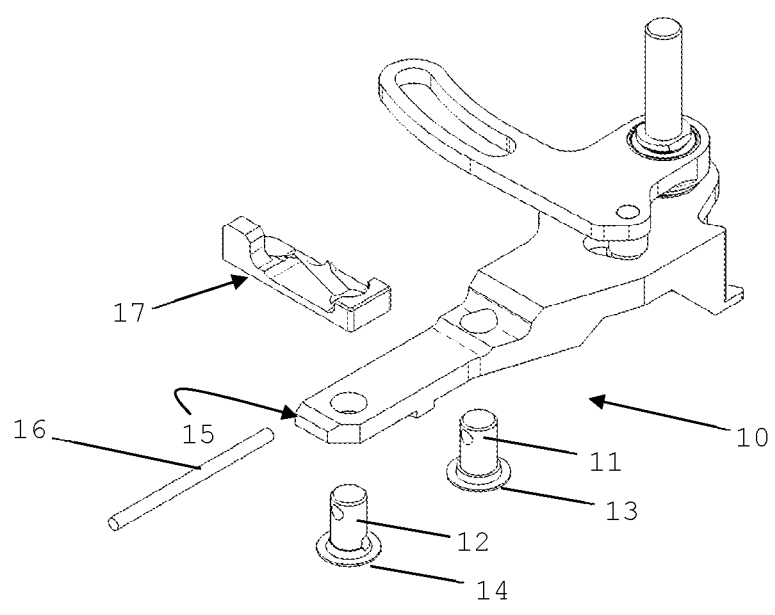
FIGS. 3A and 3B are exploded views of a first exemplary embodiment of the mounting frame of the invention from different sides.
Figure 3B:
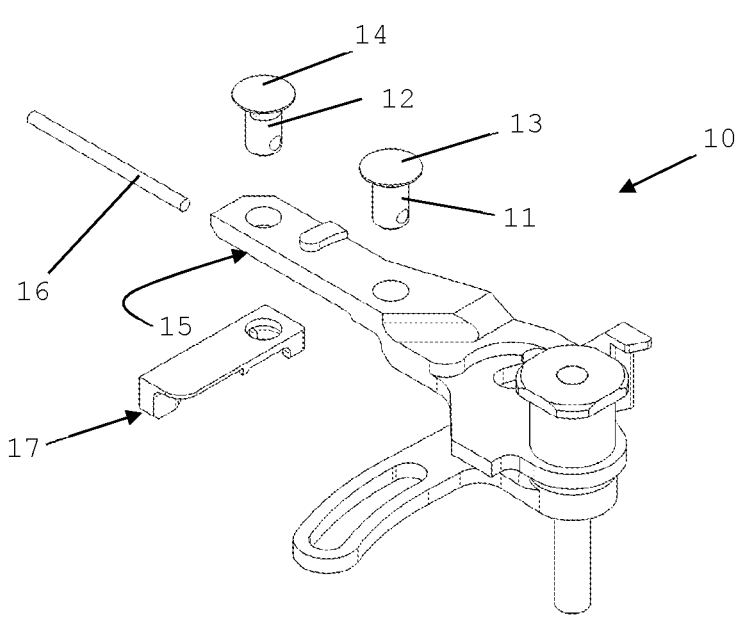

To provide a full disclosure of the construction of an exemplary mounting frame of the invention, FIGS. 3A and 3B show an embodiment of the mounting frame 10 of the invention in an exploded view from different sides. The construction of the exemplary embodiment of the mounting frame 20 as depicted in FIGS. 4 and 5 is, with the exception of some features to be discussed hereinafter, largely the same. An exploded view of the embodiment of the mounting frame 20 of FIGS. 4 and 5 is, therefore, not provided.

Figure 8:
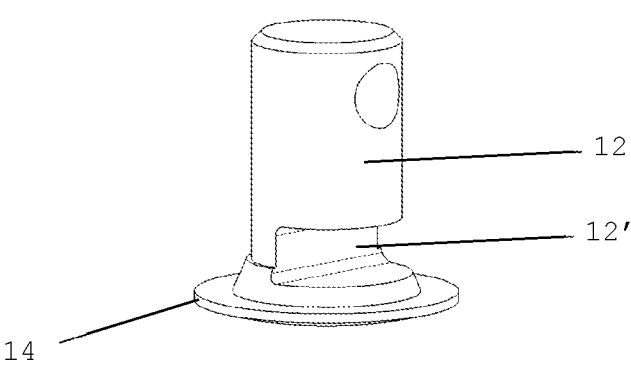
FIG. 8 shows one of the exemplary arresting pins in detail.

Turning now to a discussion of the exemplary embodiments of the mounting frame 10, 20 shown in FIGS. 1 through 5, for brevity, the following elucidation continuously refers to both embodiments depicted at the same time, and with further reference to FIGS. 6-8 where this is helpful for a proper understanding of the invention.

A common denominator of the exemplary mounting frame 10, 20 of the invention is that this mounting frame 10, 20 is provided with a quick release mechanism for quickly mounting or dismounting of the processing knife 30 while avoiding screw connections. FIGS. 6 and 7 show the dismountable poultry processing knife 30 of the invention in an intermediate stage of its mounting on an embodiment of the mounting frame 10, 20. In these FIGS. 6 and 7 also the quick release features are visible, which are arranged to cooperate with the quick release mechanism of the mounting frame 10. These features will be appropriately discussed hereinafter. According to exemplary aspects of the invention, the quick release mechanism of the mounting frame 10, 20 is designed for cooperation with the quick release features of the processing knife 30.

The quick release mechanism of the mounting frame 10, 20 includes a clamping portion for releasably clamping a rim 31 of the poultry processing knife 30—see FIGS. 6 and 7.

In one exemplary embodiment, the clamping portion of the mounting frame includes at least two arresting pins 11, 12 at a preselected distance from each other, wherein each of the arresting pins 11, 12 has a clamping head 13, 14 that is best shown in FIGS. 3A and 3B, respectively. The arresting pins 11, 12 are longitudinally moveable towards and away from a body 15, 25 of the mounting frame 10, 20 so as to move the clamping head 13, 14 between a position in which it can engage the rim 31 of the poultry processing knife 30 and another position in which it is disengaged from the rim 31 of the poultry processing knife 30. FIGS. 6 and 7 show a situation wherein one of the clamping heads, i.e. clamping head 13 engages the rim 31 of the poultry processing knife 30.

For this exemplary embodiment, the at least two arresting pins 11, 12 are jointly or simultaneously movable towards and away from the body 15, 25 of the mounting frame 10, 20 so as to make mounting or dismounting easy and to ensure a correct positioning of the poultry processing knife 30 during its clamping. Correspondingly the dismountable poultry processing knife 30 of this exemplary embodiment is provided with receptacles 32, 33 that are equipped to receive the arresting pins 11, 12 that form part of the quick release mechanism of the mounting frame 10, 20. FIGS. 6 and 7 show that the receptacles 32, 33 are provided on a rim 31 of the poultry processing knife 30, which rim 31 is arranged to be clamped by the releasable clamping portion of the mounting frame 10, 20.

In an exemplary embodiment of the mounting frame 10, 20, the at least two arresting pins 11, 12 are connected with a rod 16 which extends generally parallel to the body 15, 25 of the mounting frame 10, 20 so as to enable that movement of the rod 16 in a direction generally perpendicular to the body 15, 25 of the mounting frame 10, 20 causes movement of the at least two arresting pins 11, 12. This movement of the rod 16 can be arranged in several ways.

The quick release mechanism of the mounting frame 10, 20 can include a lever 17, 27 that engages the rod 16 connecting the at least two arresting pins 11, 12. To that end, the lever 17, 27 is movable for moving the rod 16 vis-à-vis the body 15, 25 of the frame 10, 20. The use of such a lever 17, 27 further promotes the ease of mounting and dismounting a poultry processing knife 30 on or from the mounting frame 10, 20.

One thing and another is then preferably arranged such that the lever 17, 27 is movable between a first position, wherein the quick release mechanism is unlocked, and a second position wherein the quick release mechanism is locked. FIG. 1 shows the unlocked position of the quick release mechanism according to this exemplary embodiment of the mounting frame 10, whereas FIG. 4 shows the unlocked position of the quick release mechanism according to the exemplary embodiment of the mounting frame 20 of FIG. 4. Conversely, FIG. 2 shows the locked position of the quick release mechanism according to the exemplary embodiment of the mounting frame 10 of FIG. 1, whereas FIG. 5 shows the locked position of the quick release mechanism according to the embodiment of the mounting frame 20 of FIG. 4.

For this exemplary embodiment, the lever 17, 27 includes an indented portion. This indented portion is best shown in the embodiment of the mounting frame 10 of FIG. 1, wherein the indented portion is indicated with reference 18. This indented portion 18 is arranged to stably receive the rod 16 connecting the at least two arresting pins 11, 12, when the lever 16 is in the second position wherein the quick release mechanism is locked. This avoids that the lever 16 may unintentionally move to the first position wherein the quick release mechanism is unlocked, and that consequently the poultry processing knife 30 may get released from the mounting frame 10, 20.

A further exemplary feature is that at least one of the two arresting pins 11, 12 may be provided with a slit in a vicinity of the respective clamping heads 13, 14 of the arresting pins 11, 12, which slit of each arresting pin 11, 12 is dimensioned to receive and/or enable passage of the rim 31 of the processing knife 30. The slit 12' and its location is best shown in FIG. 8 exhibiting a single arresting pin 12.

The body 15, 25 of the mounting frame 10, 20 may be equipped with a protrusion 19 which is best shown in FIGS. 6 and 7. This protrusion 19 is arranged to guide the processing knife 30 during its mounting on or dismounting from the body 15, 25 of the mounting frame 10, 20. Correspondingly, the rim 31 of the poultry processing knife 30 may be provided with a guiding slit 34 which is tailored to the protrusion 19 provided on the body 15, 25 of the mounting frame 10, 20 to guide the processing knife 30 during its mounting on or dismounting from the body 15, 25 of the mounting frame 10, 20.

The mounting frame 10, 20 and the dismountable poultry processing knife 30 of exemplary embodiments of the invention are usable in a diversity of poultry processing applications, such as in a boning operation, wherein the knife 30 can have a curved cutting edge 35 pointing away from the rim 31 of the poultry processing knife 30, which is designed to cooperate with the mounting frame 10, 20. This is depicted in FIG. 6 and FIG. 7.

Figure 9:
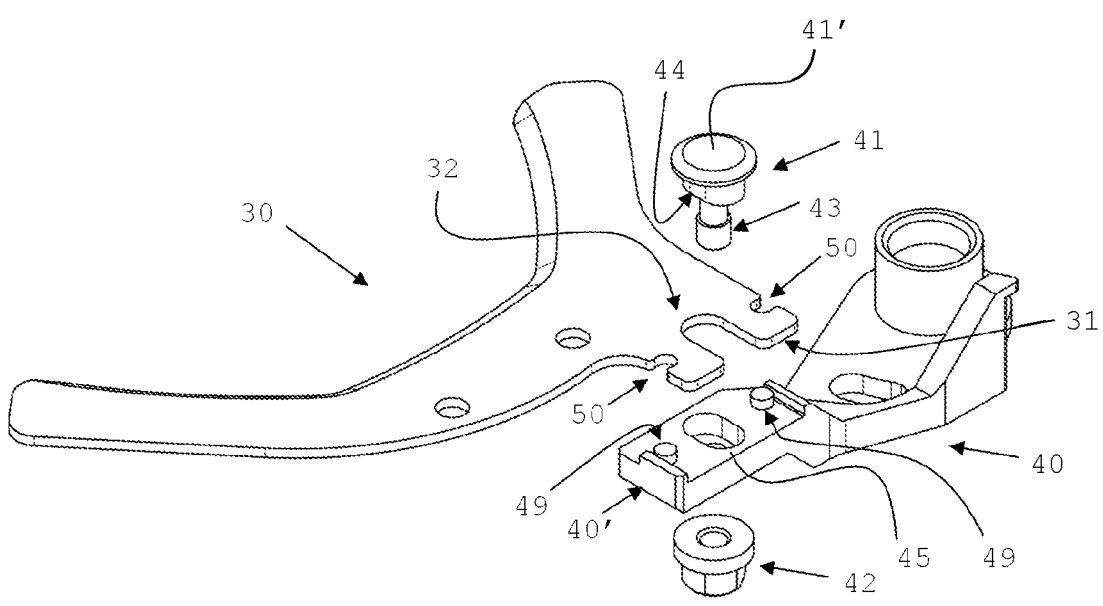
Figure 10:
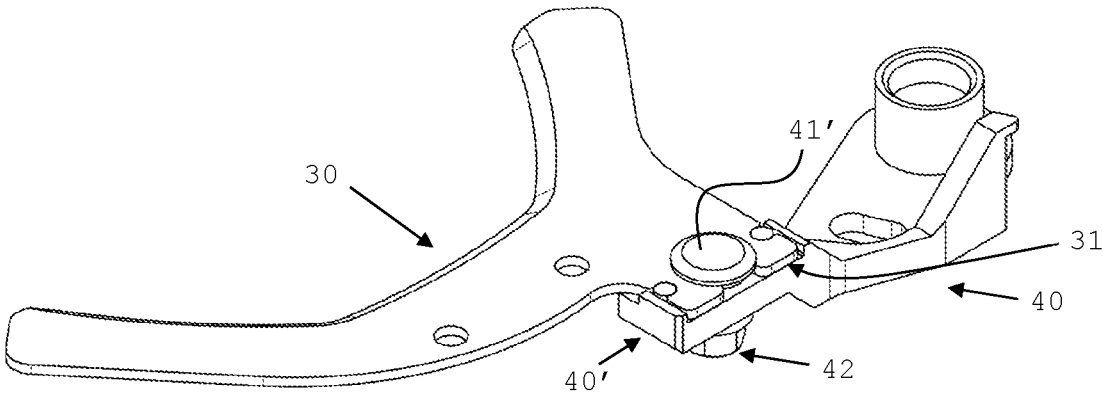
Figure 11:
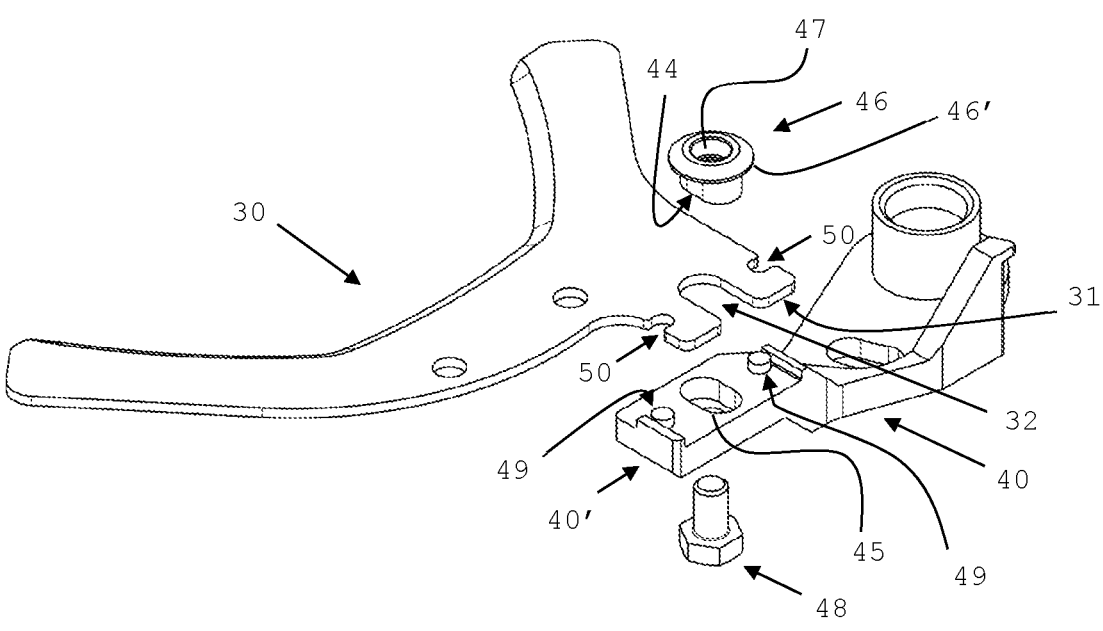
Figure 12:
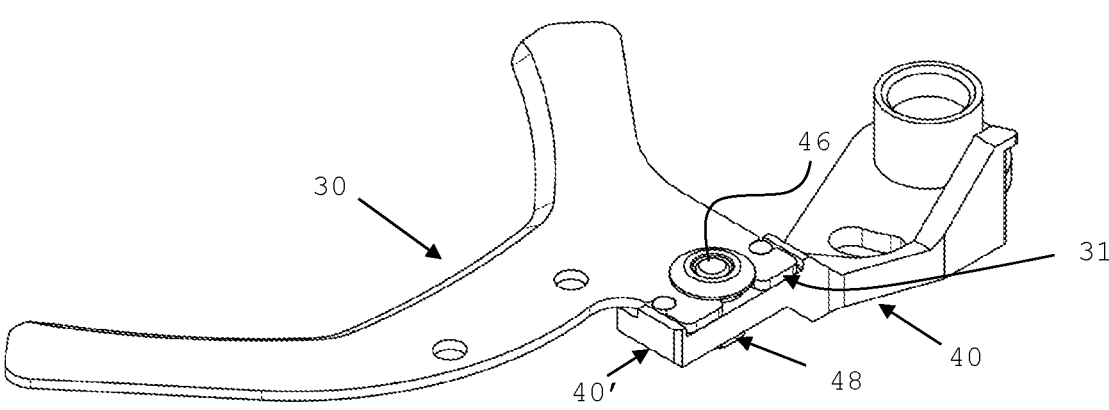

Further embodiments of a mounting frame 40 according to exemplary embodiments of the invention are depicted in FIGS. 9 and 10, and in FIGS. 11 and 12.

In these exemplary embodiments, the clamping portion includes a single arresting pin 41, 46 with a clamping head 41', 46'. The arresting pin 41, 46 is longitudinally moveable with respect to a body 40' of the mounting frame 40 so as to move the clamping head 41', 46' between a position in which it clampingly engages the rim 31 of the poultry processing knife 30 (as shown in FIGS. 10 and 12) and another position in which it is disengaged or loose from the rim 31 of the poultry processing knife 30. For reasons of clarity of the following explanation pertaining to the construction of the pin, FIGS. 9 and 11 show, contrary to practicing of the invention, that the pin 41, 46 is entirely loose from the mounting frame 40. However, while practicing exemplary embodiments of the invention, the pin 41, 46 remains mounted or attached to the mounting frame 40 when removing the poultry processing knife 30 from the mounting frame 40, and when mounting the poultry processing knife 30 to the mounting frame 40.

FIGS. 9 and 10 show an exemplary embodiment wherein the pin 41 is provided with external screw thread 43 and arranged to cooperate with a nut 42 so as to clampingly engage the rim 31 of the poultry processing knife 30 with the clamping head 41' of the pin 41.

Conversely FIGS. 11 and 12 show another exemplary embodiment wherein the pin 46 is provided with a longitudinal through hole with internal screw thread 47 and arranged to cooperate with a bolt 48 so as to clampingly engage the rim 31 of the poultry processing knife 30 with the clamping head 46' of the pin 46.

In the embodiments of FIGS. 9-12, the pin 41, 46 is provided with external flat portions 44 arranged to cooperate with mating surfaces 45 forming part of the mounting frame 40 so as to prevent rotation of the pin 41, 46.

It is further shown in FIGS. 9-12 that the body 40' of the mounting frame 40 is equipped with at least one protrusion 49 that is arranged to secure the position of the knife 30 with respect to the mounting frame 40. This at least one protrusion 49 cooperates with at least one slit 50 which is tailored to the protrusion or protrusions 49 provided on the body 40' of the mounting frame 40, primarily to secure the position of the knife 30 with respect to the mounting frame 40.

Embodiments of the invention can be desirably applied in a processing line providing a continuous operation on a series of poultry carcasses, which is then accordingly equipped with a mounting frame 10, 20, 40 for a dismountable poultry processing knife 30. Accordingly the dismountable poultry processing knife 30 is then mounted on the mounting frame 10, 20, 40.

Embodiments of the present invention can include every combination of features that are disclosed herein independently from each other. Although the invention has been discussed in the foregoing with reference to exemplary embodiments of the invention, the invention is not restricted to these particular embodiments which can be varied in many ways without departing from the invention. The discussed exemplary embodiments shall therefore not be used to construe the appended claims strictly in accordance therewith. On the contrary the embodiments are merely intended to explain the wording of the appended claims without intent to limit the claims to these exemplary embodiments. The scope of protection of the invention shall therefore be construed in accordance with the appended claims only, wherein a possible ambiguity in the wording of the claims shall be resolved using this exemplary embodiment.

Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. A mounting frame for a dismountable poultry processing knife, the processing knife having a rim and quick release features, the mounting frame comprising:

a body including a longitudinal mating surface and equipped with at least one protrusion that is arranged to i) guide the processing knife during its mounting on or dismounting from the body of the mounting frame, ii) to secure the position of the poultry processing knife with respect to the mounting frame, or iii) both; and a quick release mechanism for quickly mounting or dismounting of the poultry processing knife, the quick release mechanism in cooperation with the quick release features of the poultry processing knife, the quick release mechanism including a releasable clamping portion for releasably clamping the rim of the processing knife, the clamping portion comprising at least one arresting pin extending through the body of the mounting frame, the at least one arresting pin comprising a clamping head, the at least one arresting pin longitudinally moveable with respect to the body of the mounting frame so as to move the clamping head between a position in which it clampingly engages the rim of the poultry processing knife and another position in which it is disengaged or loose from the rim of the poultry processing knife while remaining mounted or attached to the mounting frame; and wherein the at least one arresting pin includes an external flat portion extending perpendicular to the clamping head, and wherein the external flat portion of the at least one arresting pin is engaged with the longitudinal mating surface of the body so as to prevent rotation of the at least one arresting pin.

2. The mounting frame of claim 1, wherein the at least one arresting pin is provided with an external screw thread and is arranged to cooperate with a nut so as to clampingly engage the rim of the poultry processing knife with the clamping head of the pin.

3. The mounting frame of claim 1, wherein the pin is provided with a longitudinal through-hole with internal screw thread and arranged to cooperate with a bolt so as to clampingly engage the rim of the poultry processing knife with the clamping head of the pin.

4. A dismountable poultry processing knife for mounting on a mounting frame according to claim 1, the processing knife having quick release features arranged to cooperate with the quick release mechanism of the mounting frame, the quick release features comprising at least one receptacle for the at least one arresting pin of the mounting frame, the at least one receptacle provided on the rim of the poultry processing knife, wherein the rim is arranged to be clamped by the releasable clamping portion of the mounting frame.

5. The dismountable poultry processing knife of claim 4, wherein the at least one receptacle is equipped to snugly receive the at least one arresting pin therein that forms part of the quick release mechanism of the mounting frame.

6. The dismountable poultry processing knife of claim 4, wherein the rim of the poultry processing knife is provided with at least one guiding slit which is tailored to a protrusion or protrusions provided on the body of the mounting frame to guide the poultry processing knife during its mounting on or dismounting from the body of the mounting frame or to secure the position of the poultry processing knife with respect to the mounting frame.

7. The dismountable poultry processing knife of claim 4, wherein the poultry processing knife has a curved cutting edge pointing away from the rim of the poultry processing knife that is designed to cooperate with the mounting frame.

8. A poultry processing line that is equipped with a mounting frame according to claim 1 for mounting a dismountable poultry processing knife.

9. A poultry processing line that is equipped with a dismountable poultry processing knife according to claim 4, the dismountable poultry processing knife mounted on the mounting frame.

10. A mounting frame for a dismountable poultry processing knife, the processing knife having a rim and quick release features, the mounting frame comprising:

a body; and a quick release mechanism for quickly mounting or dismounting of the poultry processing knife, the quick release mechanism including a clamping portion for releasably clamping the rim of the processing knife, the clamping portion comprising at least two arresting pins extending through the body of the mounting frame and jointly movable towards and away from the body of the mounting frame, the at least two arresting pins each comprising a clamping head, the at least two arresting pins longitudinally moveable with respect to the body of the mounting frame so as to move each clamping head towards and away from the body between a first position in which the clamping head engages the rim of the poultry processing knife and a second position in which the clamping head is disengaged or loose from the rim of the poultry processing knife while remaining mounted or attached to the mounting frame, wherein the at least two arresting pins are connected with a rod that extends generally parallel to the body of the mounting frame so as to enable that movement of the rod in a direction transverse to the body of the mounting frame causes movement of the at least two arresting pins, wherein at least one of the two arresting pins defines a slit in a vicinity of a respective clamping head of at least one of the two arresting pins, wherein the slit is dimensioned to receive, or enable passage of, the rim of the processing knife; and a lever for moving the at least two arresting pins between the first position and the second position, the lever having an indented portion arranged to stably receive the rod connecting the at least two arresting pins when the quick release mechanism is in a locked position, the lever movable for moving the rod relative to the body of the mounting frame in a direction transverse to the body of the mounting frame, the lever configured to change the quick release mechanism between the locked position and an unlocked position.

11. The mounting frame of claim 10, wherein the body of the mounting frame is equipped with at least one protrusion that is arranged to i) guide the processing knife during its mounting on or dismounting from the body of the mounting frame, ii) to secure the position of the poultry processing knife with respect to the mounting frame, or iii) both.

* * * * *